United States Patent [19]
Lecoeur

[11] 3,736,052
[45] May 29, 1973

[54] REFLEX MOTION PICTURE CAMERA MECHANISM

[75] Inventor: Jacques Lecoeur, Paris, France

[73] Assignee: Eclair International, Paris, France

[22] Filed: Aug. 2, 1971

[21] Appl. No.: 168,012

[30] Foreign Application Priority Data

Jan. 28, 1971 France................................7102816

[52] U.S. Cl...................................352/166, 352/191
[51] Int. Cl..............................................G03b 1/18
[58] Field of Search......................352/166, 191, 192, 352/193, 194, 195, 196

[56] References Cited

UNITED STATES PATENTS

| | | | |
|---|---|---|---|
| 3,187,340 | 6/1965 | Misawa | 352/166 |
| 2,983,185 | 5/1961 | Grotzschel | 352/192 |
| 3,428,394 | 2/1969 | Wessner | 352/166 |
| 2,551,085 | 5/1951 | Bach | 352/166 |
| 2,753,755 | 7/1956 | Weissbrodt | 352/192 |
| 3,135,156 | 6/1964 | Thevenaz | 352/194 |

FOREIGN PATENTS OR APPLICATIONS 1,464,788  11/1966  France................................352/166

Primary Examiner—Samuel S. Matthews
Assistant Examiner—Monroe H. Hayes
Attorney—Irving M. Weiner

[57] ABSTRACT

A rotary shutter, a movable mirror and a film moving mechanism are mounted on the same face of a relatively thin plate in which the film gate and the exposure window are formed. A power shaft is mounted parallel to, and at a relatively short distance from, one face of the plate, with one end flush with a plate edge to permit the direct coupling of the power shaft to the camera motor. Means are provided for coupling the power shaft with the film moving mechanism, the rotary shutter and the movable mirror.

8 Claims, 6 Drawing Figures

INVENTOR
JACQUES LECOEUR

BY *Irving M. Weiner*
ATTORNEY

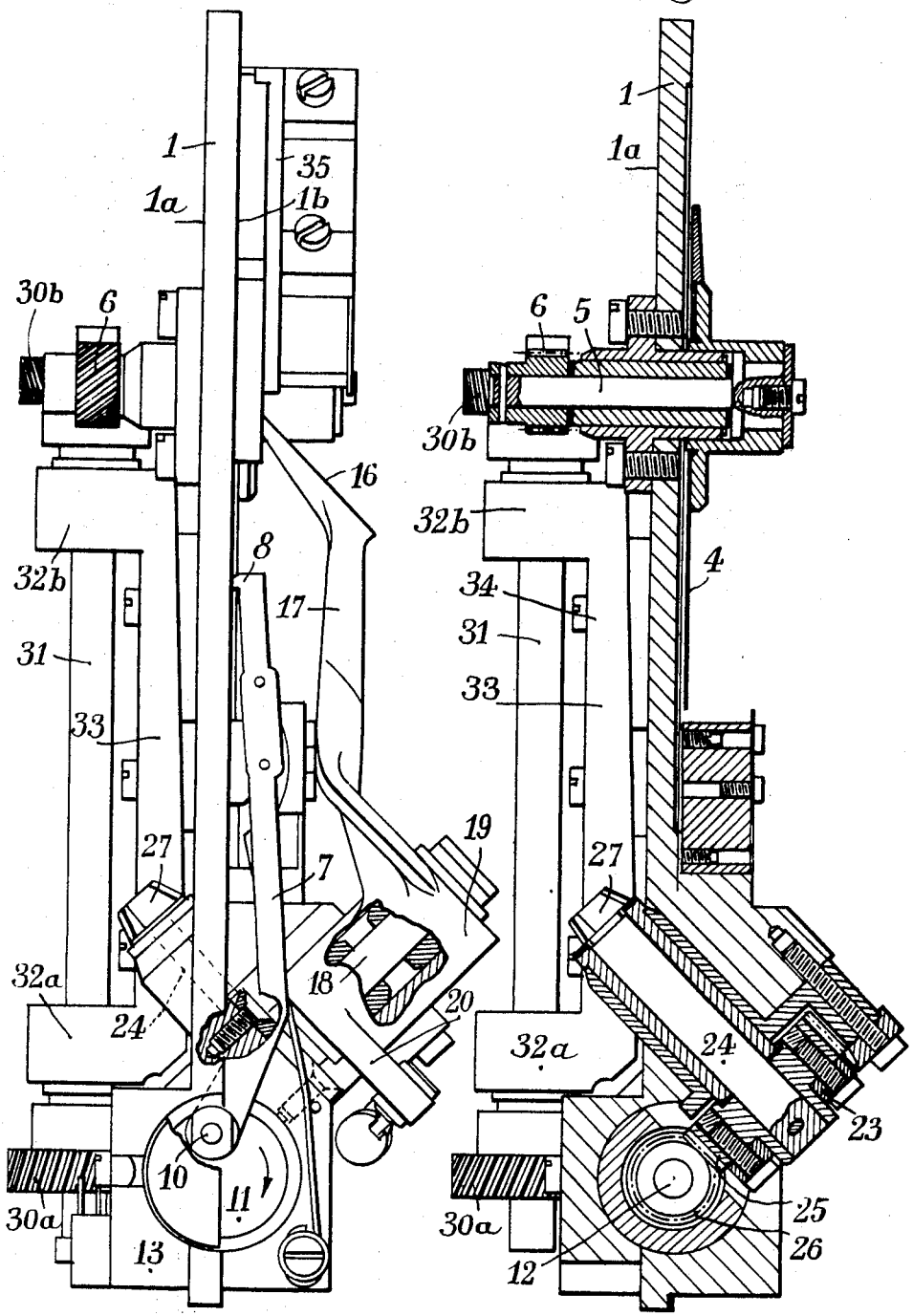

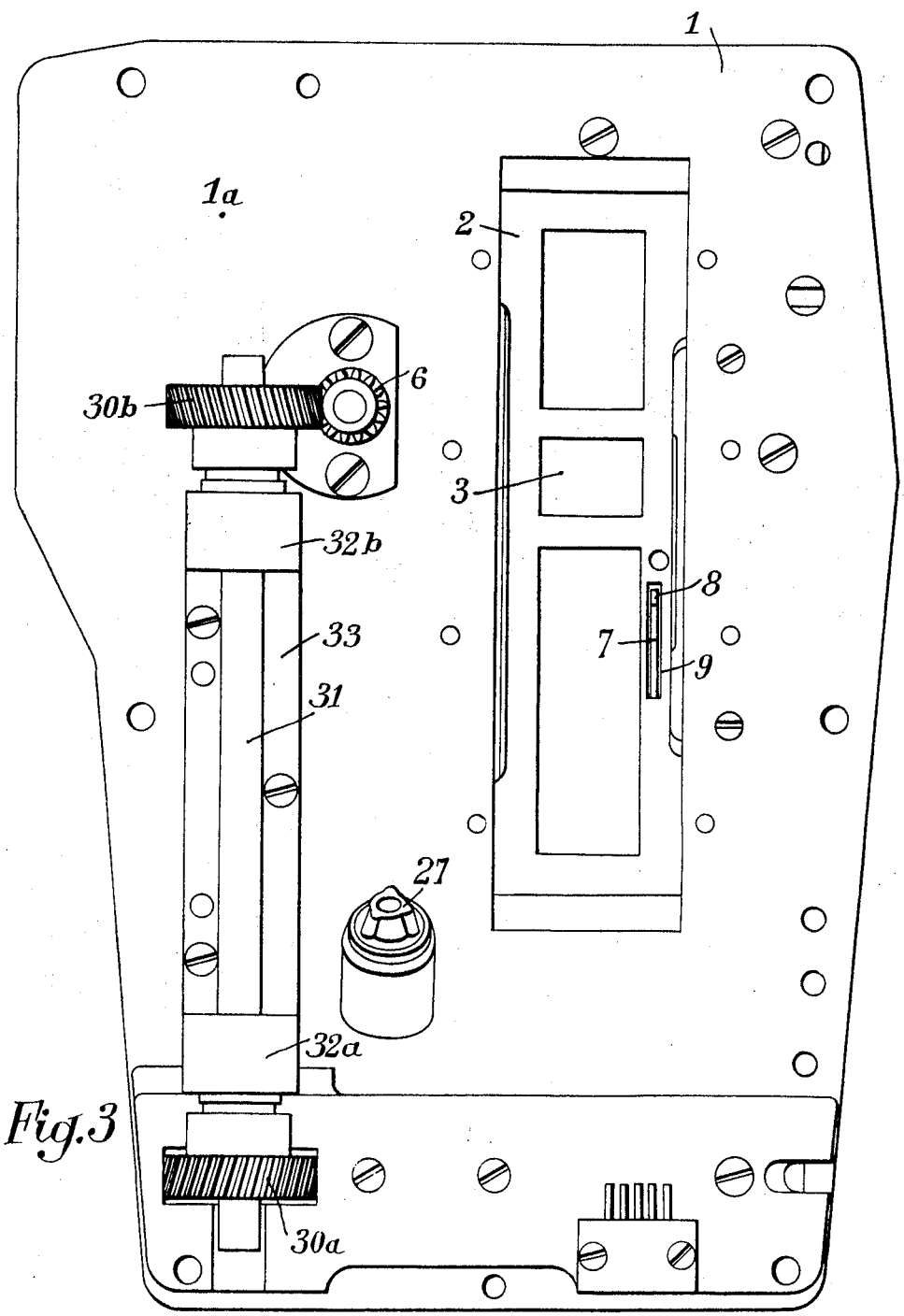

REFLEX MOTION PICTURE CAMERA MECHANISM

FIELD OF THE INVENTION

The present invention relates to mechanisms for reflex-type motion picture cameras.

DESCRIPTION OF THE PRIOR ART

Various types of reflex cameras are already known in the art, notably those wherein the mechanism comprises at least one rotary shutter and a rotary mirror, possibly operatively interconnected, and a film moving mechanism actuated through an eccentric. In these known cameras the main component elements of the mechanism, as mentioned hereinabove, are mechanically independent of each other, for example by being mounted on different inner walls of the camera housing. As a result, the camera structure is rather elaborate and in addition it must compulsorily comprise, for coupling the various elements of the mechanism to the single driving motor, a same number of transmissions, independent of each other and extending through the camera along relatively considerable distances and in different directions as required on account of the particular positions of the various members to be actuated. Under these conditions, it is obvious that the mechanisms of reflex-type cameras, especially those having performances consistent with a professional use, constitute in general very expensive assemblies due notably to the great number of mechanical parts involved, such as shafts, pinions, etc.. On the other hand, each one of these known mechanisms is strictly adapted to the camera to which it is applied. Consequently, both routine maintenance and possible repair works in such mechanisms require the complete disassembling of the camera. Finally, the multiple, relatively long and complicated transmissions incorporated in the hitherto known reflextype motion picture cameras for professional use cannot be rendered noiseless unless the camera is mounted in a special box lined internally with rubber, which is an obviously expensive solution attended by various technical inconveniences.

SUMMARY OF THE INVENTION

The mechanism according to the present invention for a reflex motion picture camera is free of the above-mentioned inconveniences characterizing hitherto known reflex camera mechanisms. The mechanism according to the present invention is characterized in that at least the shutter, the mirror and the film moving mechanism are mounted on a common, relatively thin plate provided with the film gate and the exposure window, that a power shaft is mounted parallel to said plate in a recess of, or relatively close to, said plate, a first end of said power shaft being flush with one edge of said plate to permit the direct coupling of said end with a motor adapted to be secured near said plate edge, and that said power shaft drives the shafts of the eccentric, and of the rotary shutter and mirror: the one directly, and the other or others via gear transmissions of suitable gear ratios, said transmission comprising at least one bevel gear.

All the component elements of the camera mechanism according to the present invention, including the motor coupling shaft, are thus mounted on a common, relatively thin plate and suitably distributed on both sides of this plate and/or in recesses thereof so as to constitute a unitary structure having in either direction the same dimensions as the plate and, in a direction at right angles to its faces, dimensions only slightly greater than the plate thickness.

Of course, this complete and compact mechanism can be incorporated in cameras of very different types, since the only requirement to be met is the possibility of inserting the complete plate between the camera lens output and the device guiding the film towards its gate; now, this last-mentioned device may consist essentially of the outlet face of an interchangeable film magazine, said face being adapted to engage that face of said plate in which the film gate is formed, whereby the film emerging from said magazine penetrates directly into its gate. On the other hand, whatever the camera in which this mechanism is utilized, the latter can easily be removed therefrom for maintenance and repair purposes, without interfering with any other camera element. Finally, the camera mechanism according to the present invention is extremely noiseless in operation, due notably to the very small number of gear transmissions comprised therein, and also to the reduced length of these transmissions and their moderate number of noise-generating members, such as pinions. In fact, the motor secured to the plate very close to one of its edges is coupled directly to the power shaft provided in or on this plate, and this power shaft itself may drive directly for example the eccentric of the film moving mechanism; under these conditions the only sources of noise are the two gear transmissions operatively connecting the power shaft to the shafts of the shutter and rotary mirror respectively (a single transmission being sufficient in case these two devices are combined with each other).

BRIEF DESCRIPTION OF THE DRAWING

A typical form of embodiment of the mechanism of the invention will now be described by way of illustration and example, in the specific case of a reflex-type camera comprising an oscillating mirror and a detachable or interchangeable film magazine. In the drawings:

FIG. 2 is a side elevational view of the mechanism supporting plate; as seen in the direction of the arrow II of FIG. 1;

FIG. 3 is a front view of the plate supporting the mechanism as seen from the detachable magazine side;

FIGS. 4, 5 and 6 are sections taken along the lines IV—IV, V—V and VI—VI, respectively, of FIG. 1.

DESCRIPTION OF THE PREFERRED EMBODIMENT

Figure 5:
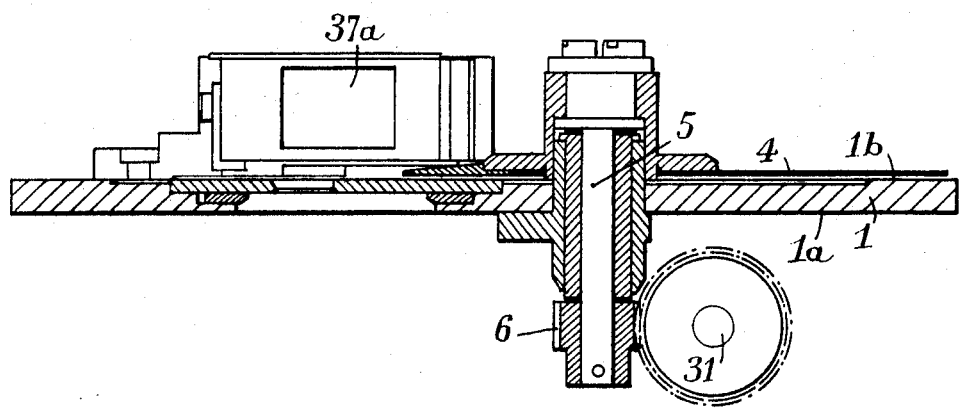

The complete camera mechanism according to this invention is carried by a single metal plate 1, relatively thin but of sufficient stiffness, the face 1a of this plate, which is to register with the detachable film magazine (not shown), having formed therein a channel 2 constituting the film gate (FIG. 3) in which an exposure window 3 is formed. The film gate 2 extends substantially parallel to a lateral edge of the plate 1. The other face 1b of this plate, which faces the output end of the lens (not shown) has rotatably mounted thereon a shutter consisting essentially of a circular sector 4 carried by a shaft 5 (FIGS. 4 and 5) extending through or protruding from the plate 1 and carrying on its end projecting or protruding from the side 1a of plate 1 a pinion 6. On the other side 1b of plate 1 the film moving mechanism is disposed parallel to the film gate 2, this mechanism comprising essentially a lever 7

(FIG. 2) adapted to engage with its claw-forming upper end 8 the film perforations through a longitudinal slot 8 formed in said film gate 1 (see FIG. 3), the lower end of said lever 7 being operatively connected to a mechanism adapted to impart a longitudinal reciprocating movement of suitable frequency and amplitude to said lever, this lastnamed mechanism consisting essentially, in the exemplary form of embodiment proposed herein, a crankpin 10 (FIG. 2) carried in an eccentric position by a rotary circular plate 11, the lower end of lever 7 being pivotally mounted to said crankpin, as shown. The means contemplated for imparting to the claw 8 of lever 7 a transverse reciprocating movement in synchronism with its longitudinal reciprocating movement, so that said claw 8 engages a film perforation every other cycle of its longitudinal reciprocating movement, may be embodied in various manners, possibly differing from that illustrated in FIG. 2. Therefore, these means may be omitted from the detailed description of the invention, since they are no part thereof and other types of film moving mechanisms may be used without departing from the basic principles of the present invention.

Figure 6:
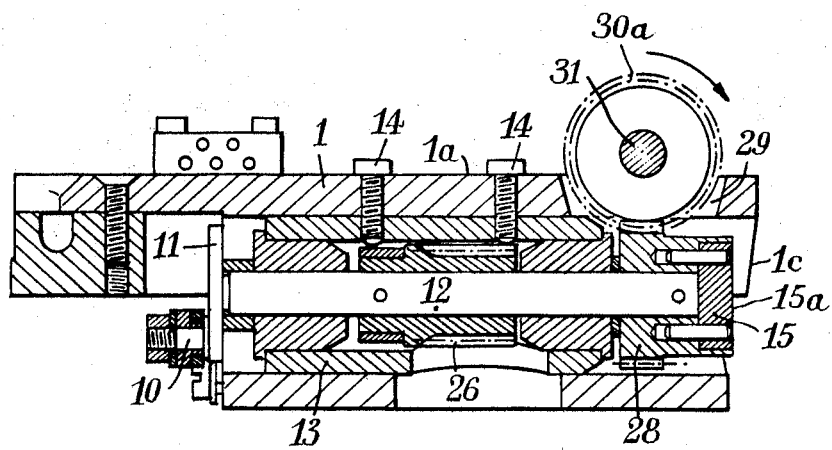

FIG. 6 shows how the rotary plate 11 actuating the eccentric is carried in turn by one end of a power shaft 12 disposed at right angles or substantially transverse to the film gate 2 (i.e. horizontally in FIGS. 1 and 3), so that it can rotate freely in a kind of auxiliary housing 13 secured to the lower portion of plate 1 by means of screws 14. The other end of shaft 12 is flush with the corresponding edge 1c of plate 1 and carries a member 15 permitting of coupling said power shaft 12 directly with a motor adaptable near the edge 1c of plate 1 through means not shown and incorporated essentially in the camera housing. In fact, it is already known to provide cameras of this type with a detachable motor such that when positioned and secured to the camera housing its shaft is coupled automatically to a power shaft such as 12. These known means are easily adaptable to the mechanism of this invention; the automatic coupling member 15 may consist simply of a circular plate of which the outer face 15a normally accessible through an aperture of the camera housing (not shown) carries at least two sockets engageable by tenons or studs of corresponding configuration carried by the end of the power shaft.

The specific form of embodiment of the camera mechanism according to this invention, which is contemplated herein and intended more particularly for a reflex camera, incorporates an oscillating or rotary mirror of the type described in the French Pat. No. 1,464,788. This mirror 16 is carried by an arm 17 mounted to the face 1b of plate 1, so that it can pivot freely about a pin or shaft 18 secured in turn to the aforesaid plate face 1b, whereby the mirror 16 will block the light beam projected by the lens towards the exposure window 3 when the arm 17 is in its intermediate position (i.e. its vertical position in FIG. 1); the pin 18 of arm 17 is mounted preferably with a moderate inclination to the face 1b of plate 1, as shown more clearly in FIG. 2. This arrangement, as well as others to be described presently, are effective for reducing the overall dimensions of the mechanism of this invention in a direction at right angles to the plate 1 supporting it, that is, horizontally as seen in FIG. 2. The arm 17 pivoted to said pin 18 by means of a hub 19 is rigid with a radial lug 20 formed integrally therewith and adapted to be actusite end pivotally connected to an adjustable crank and rod system which includes eccentric crankpin 22 carried by a rotary circular plate 23. This rotary circular plate 23 is rigidly connected in turn to the end of a shaft 24 (see FIG. 4) extending through plate 1 in a direction perpendicular to the pivot pin 18 of arm 17 (FIG. 2). This shaft 24 carries a pinion 25 meshing with another pinion 26 (see FIGS. 4 and 6) secured in turn to power shaft 12. The end of shaft 24 emerging from the face 1a of plate 1 carries an automatic coupling member 27 (FIG. 4) which, when a detachable film magazine (not shown) is positioned in the camera (this magazine being of any suitable and known type), is adapted, when the film outlet face of this magazine engages the face 1a of plate 1, automatically to engage the free end of the shaft provided in said magazine for actuating its feed spool and the hub of its take-up spool, as will be explained presently more in detail.

The power shaft 12 carries on the other hand, near its coupling member 15 (FIG. 6) a pinion 28 which, through a notch 29 formed in plate 1, is adapted to mesh with another pinion 30a secured in turn to a rotary shaft 31 mounted parallel to and at a relatively short distance from the plate 1 (see FIGS. 2 to 4). In the exemplary form of embodiment described herein this shaft 31 is mounted in a pair of bearings 32a and 32b secured to the face 1a of plate 1 by means of a common bracket 33 and screws 34. On the other hand the shaft 31 carries above the upper bearing 32b a pinion 30b meshing with the above-mentioned pinion 6 carried by one end of the shutter shaft 5.

Finally, the face 1b of plate 1 carries, just above the exposure window 3, an optical transmission device secured thereto by a screwed support 35 and adapted to project onto the input face of the eyepiece (not shown) of the camera the light beam reflected by the mirror 16 when the latter is in its median position and registers with the exposure window 3; in the form of embodiment described herein this optical transmission device comprises an isosceles right-angle prism 37 of which the input face 37a parallel to the upper edge of exposure window 3 is frosted, and also a collecting lens, for example of plano-convex type 38, secured for example by cementing to the output face 37b of right-angle prism 37, in front of the input face of the eyepiece (not shown).

Figure 1:
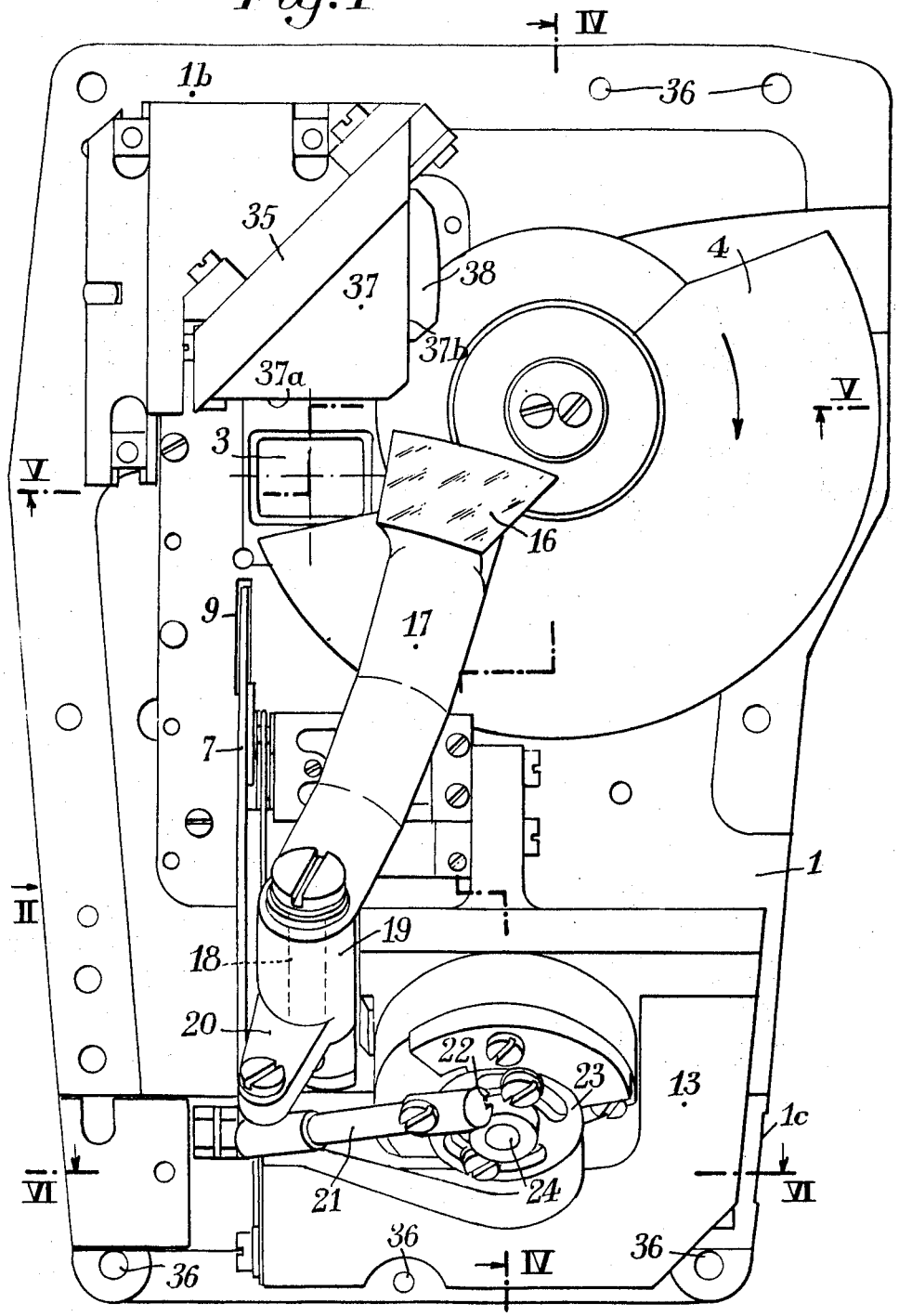
FIG. 1 is a front elevational view of the plate supporting the mechanism, which is disposed towards the camera lens outlet.

The above-described mechanism may be incorporated in a camera housing so that the face 1b of its plate 1 faces the output end of the camera lens and the light beam issuing from this lens impinges against the exposure window 3, at least when the shutter 4 and mirror 16 are in a retracted position as shown in FIG. 1. The plate 1 may be secured to the walls of the camera housing through any suitable means, notably by using screws engaging tapped holes 36 formed to this end through the marginal portion of plate 1. Of course, the camera housing must have a lateral aperture through which the free end of the shaft of the electric motor detachably secured to said housing will couple itself automatically with the member 15 provided at the registering end of the power shaft 12. In the example illustrated the plate 1 of the mechanism according to this invention constitutes so to say the rear wall of the camera housing, the film outlet face of a detachable film magazine of any suitable and possibly known type engaging the face 1a of plate 1, the magazine being held against motion in relation to this face 1a through any suitable means, possibly through known means, whereby the film length emerging from the magazine will engage automatically the film gate 2. As already explained in the foregoing, when the magazine is positioned against the face 1a of plate 1, the member 27 carried by the free end of a shaft provided in said detachable magazine is coupled automatically so as to actuate its feed spool and the hub or core of its take-up spool.

A camera equipped in the manner described hereinabove operates as follows:

When the camera motor is started, its output shaft coupled to member 15 drives immediately for continuous rotation, at the selected uniform speed, the power shaft 12 of which the rotational movement is imparted directly to the eccentric 10, 11 producing the longitudinal reciprocating movement of the claw lever 7 and consequently the discontinuous or intermittent film feed in a manner well known per se; the rotation of power shaft 12 is also transmitted via pinions 25 and 26 to the shaft 24 controlling the connecting-rod system 21, 22 and 23 so as to cause the arm 17 to oscillate about the pivot pin 18 and thus impart to the mirror 16 carried by said arm 17 a to-and-fro movement on either side of its intermediate position, in front of the exposure window 3, under the conditions set forth in the aforesaid French Pat. No. 1,464,788. On the other hand the rotation of shaft 24, which, thusly, serves as a power take-off, is also imparted via coupling member or means 27 to the corresponding shaft of the detachable film magazine (not shown) so as to drive its feed spool and the hub of its take-up spool. Finally, the rotation of said power shaft 12 is imparted through the gear transmission 28, 30a, 31, 30b and 6 to the shaft 5 of shutter 4, so as to cause this shutted 4 to rotate in synchronism with the oscillatory movement of mirror 16 and also with the film feed produced through the claw lever 7, in the manner well known to those conversant with the art of reflex motion picture cameras.

The above-described camera mechanism can be embodied with many modifications and variations, of which some will readily occur to those skilled in the art, but without departing from the scope of the invention. It has already been emphasized in the foregoing that this invention is not limited by specific types of film moving mechanism, of mirror and shutter driving systems; thus, instead of an oscillating mirror according to the French Pat. No. 1,464,788 an oscillating mirror of the type blocking the exposure window 3 only in one of its end positions, i.e. oscillating at twice the frequency of the mirror illustrated, may be used, at the expenses of the noiseless operation of the camera; it is also possible, without departing from the scope of the invention, to use a rotary mirror, notably in combination with the shutter sector 4, in a manner known per se. The optical device contemplated herein for projecting the light beam reflected by the mirror towards the eyepiece may be constructed in various ways differing from the above-described device; however, this device is advantageous on account of its constructional simplicity and considerable compactness, since it reduces to only two the number of air-glass interfaces. The power shaft arrangement, as well as the construction and arrangement of the various transmissions, are also a matter of choice; the essential requirement according to this invention is that the power shaft be mounted parallel to the plate, in a recess of, or very close to, this plate, so that one end of this power shaft be flush with one end of the plate to permit the direct coupling thereof with the camera motor, and that said power shaft can drive directly at least one of the driven members of the mechanism, these driven member or members being actuated from said power shaft through at least one gear transmission providing a suitable gear ratio, comprising a small number of pinions of relatively reduced axial dimension: as a matter of fact, the advantageous features mentioned hereinabove as characterizing the present invention are obtained only if this requirement is met, since it imparts a considerable compactness to the unitary structure constituted by the camera mechanism of this invention.

What I claim is:

1. A mechanical unit for a reflex-type motion picture camera, which comprises a relatively thin, rigid plate having substantially flat parallel faces with, on the first face, a film gate extending in a direction substantially parallel to one lateral edge of said plate, and, in said gate, a film exposure window and a slot for moving the film, said window and slot extending through the plate from its first face to its second face, a film moving mechanism mounted to the second face of said plate and comprising a claw adapted to engage the film edge through said slot, a rotary shutter and a movable mirror both mounted to said second face of said plate for alternatively permitting the passage of the light transmitted through the camera lens and said exposure window, and blocking said light and reflecting it towards the camera eyepiece, a power shaft rotatably mounted in a close and nearly parallel relationship to one of the faces of said plate, said power shaft extending in a direction substantially transverse to said film gate and to said one lateral edge of said plate, and having a first end substantially flush with said one lateral edge of said plate and adapted to be coupled to the camera motor disposed along said one lateral edge, and a second end directly coupled to said film moving mechanism, and means for drivingly coupling said power shaft to said rotary shutter and to said movable mirror, said coupling means being mounted to said plate in close vicinity of the faces thereof, whereby the mechanical unit has a very short extension in directions transverse to the two flat faces of said plate.

2. A mechanical unit as set forth in claim 1, wherein:
said shutter comprises a shaft having its intermediate portion rotatably mounted in a hole interconnecting the two flat faces of said plate, a sector-shaped shutter wedged to the end of said shutter shaft protruding from the second face of said plate, and a first pinion wedged to the end of said shaft protruding from the first face of said plate;

said film moving mechanism comprises a lever mounted to the second face of said plate and adapted to rock in a plane transverse to said plate, said lever comprising at one end the claw adapted to engage and drive the film through the plate slot, and an eccentric mounted to the second end of said power shaft for engaging the other end of said lever;

a second pinion is wedged to said power shaft and a gear transmission mounted to the first face of said plate comprises at least one third pinion meshing with said second pinion through a suitable aperture formed in said plate, and a fourth pinion meshing with said first pinion.

3. A mechanical unit as set forth in claim 1, wherein said movable mirror is carried by an arm oscillating about a shaft disposed in a slightly tilted relationship to the second face of said plate, said coupling means comprising bevel gears and a crank and rod system inserted between said power shaft and said oscillating arm.

4. A mechanical unit as set forth in claim 3, which further comprises on the first face of said plate a power take-off of the automatic coupling type for engagement with the spool driving shaft of the camera magazine, and means for coupling said power take-off to said power shaft.

5. A mechanism unit as set forth in claim 4, wherein said power take-off comprises a shaft having its intermediate portion rotatably mounted in a hole extending through said plate, from the first face to the second face thereof, and bevel gears inserted between said power shaft and the end of said power take-off shaft protruding from the second face of said plate.

6. A mechanical unit as set forth in claim 5, wherein the shaft of said arm supporting the oscillating mirror and the shaft of said power take-off are disposed substantially at right angles to each other, and the crank of said crank and rod system is mounted to the end of said power take-off shaft protruding from the second face of said plate.

7. A mechanical unit as set forth in claim 1, wherein an optical transmission device comprising an isosceles right-angle prism, and a collecting lens cemented to the output face of said prism is mounted to the second face of said plate, near said exposure window, whereby the light reflected by said movable mirror is deflected substantially at right angles towards the camera eyepiece.

8. In a motion picture camera comprising a lens, an eyepiece and a motor, the provision of a relatively thin, rigid plate having substantially flat parallel faces with, on the first face, a film gate extending in a direction substantially parallel to one lateral edge of said plate, and, in this gate a film exposure window and a slot for moving the film, said window and said slot extending through said plate from the first face to the second face thereof, a film moving mechanism mounted to said second face of said plate and comprising a claw adapted to engage the film edge through said slot, a rotary shutter and a movable mirror both mounted to the second face of said plate for alternatively allowing the light transmitted from the camera lens through said exposure window and blocking said light and reflecting same towards said camera eyepiece, a power shaft rotatably mounted in a close and nearly parallel relationship to one of the two faces of said plate, said power shaft extending in a direction substantially transverse to said film gate and to said one lateral edge of said plate and having a first end substantially flush with said one lateral edge of said plate and adapted to be coupled to the camera motor disposed along said one lateral edge, and a second end directly coupled to said film moving mechanism, and means for drivingly coupling said power shaft to said rotary shutter and to said movable mirror, said coupling means being mounted to said plate in close proximity of the faces thereof.

* * * * *